June 15, 1937.  C. A. ROESCH  2,083,668
LOCKABLE CAP FOR VEHICLE FUEL TANKS
Filed June 21, 1935
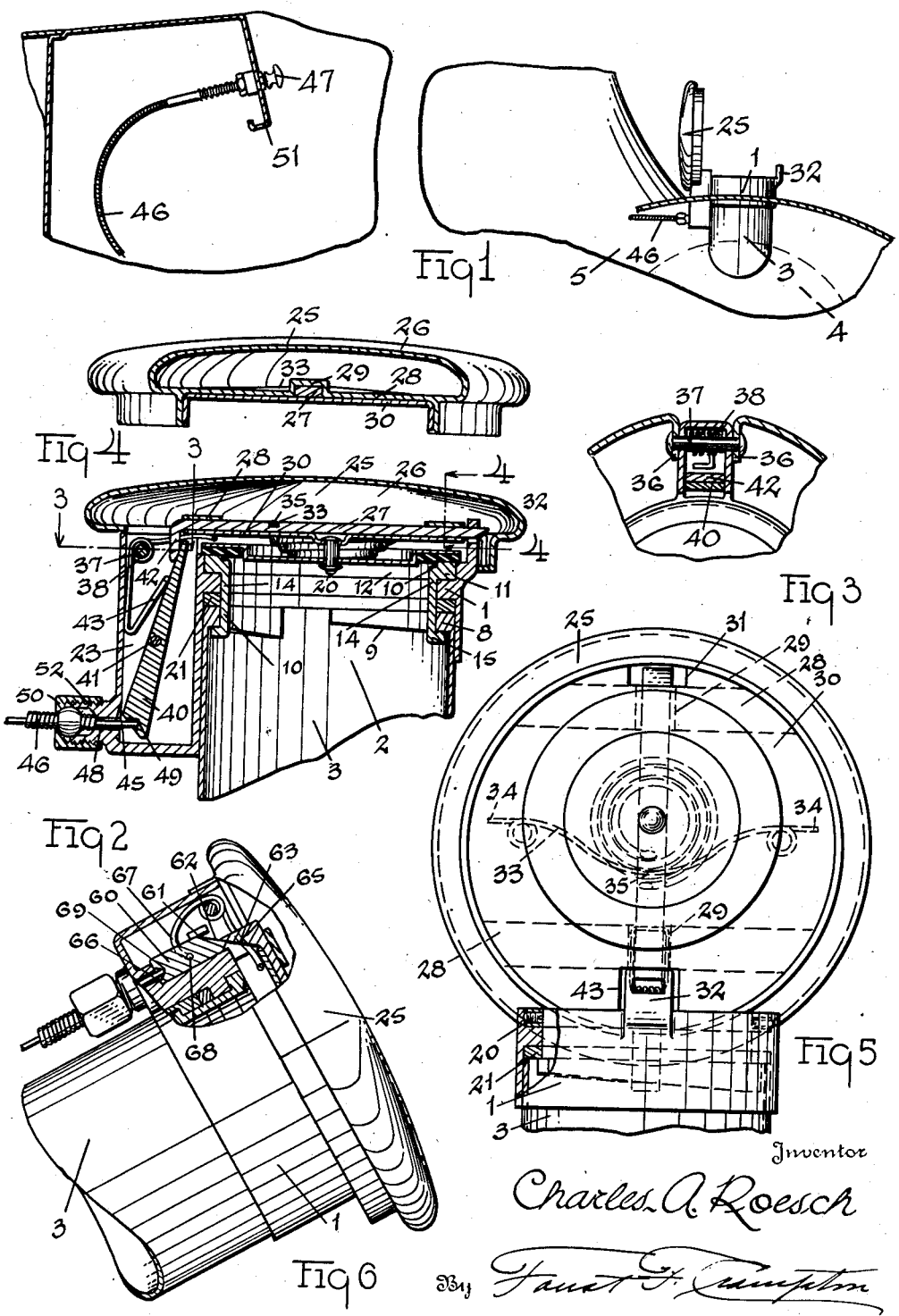
Inventor
Charles A. Roesch
By
Attorney Patented June 15, 1937

2,083,668

UNITED STATES PATENT OFFICE 2,083,668

LOCKABLE CAP FOR VEHICLE FUEL TANKS

Charles A. Roesch, Toledo, Ohio

Application June 21, 1935, Serial No. 27,669

8 Claims. (Cl. 220—55)

My invention relates generally to containers and to a means for closing the same against unauthorized entry. The invention particularly relates to a closure cap for a container adapted to automatically lock, in closed position, on the closure of said container.

My invention has for an object to provide a closure cap for a container having an associated means for locking the cap when it is placed in closure relation to the opening of the container. The invention has for a further object to provide a closure cap having means for locking the cap relative to its associated container opening, said means being operative from a point remote from the cap. The invention, therefore, readily lends itself in adaptation and use to the closure of fuel tanks mounted on motor vehicles and in its adaptation provides means for controlling the closure of the fuel tank at a point convenient to the operator of the vehicle.

Another object of the invention is to provide a controllably lockable closure cap having the means for operating the locking mechanism contained in a small, compact and unobstrusive housing whereby the appearance of the cap and its associated tank may readily blend into the general design and symmetry of the surrounding vehicle parts. A further object of the invention is to provide a cap for a container having a locking means extending transverse to the major portion of the cap body to thereby provide an element of increased resistance to attempts at forced opening of the cap. A still further object of the invention is to provide a connector element for adapting and connecting the cap and its locking mechanism to the opening of the container.

A particular object of the invention is to provide a collar for surrounding a container opening having connector means for locking the collar in position with reference to the opening and having a housing portion on which a cap is movably supported and in which the lock operating means is mounted to operate a latch bolt extending through the cap to engage a keeper formed on the collar. A further particular object of the invention is to provide an efficient cap and locking means therefor of a relatively low cost and easy installation.

The invention consists in other features and advantages which will appear from the following description and upon examination of the drawing. Structures containing the invention may partake of different forms and may be varied in their details and still embody the invention. To illustrate a practical application of the invention I have selected a lockable cap for vehicle fuel tanks embodying the invention and one of its modified forms as examples of the various structures and details thereof that contain the invention, and shall describe the selected structures hereinafter, it being understood that variations may be made without departing from the spirit of the invention. The particular structures selected are shown in the accompanying drawing.

Fig. 1 of the drawing illustrates a view of a vehicle body together with a lockable cap embodying my invention and its appertaining parts mounted on the vehicle body, some of the body parts being shown cut away to facilitate illustration. Fig. 2 illustrates a view of a longitudinal section of the cap in an installed relation with the container opening. Fig. 3 illustrates a view of a section taken on the plane of the line 3—3 indicated in Fig. 2. Fig. 4 illustrates a view of a section taken on the plane of the line 4—4 indicated in Fig. 2. Fig. 5 illustrates a face view of the inner side of the cap shown in Fig. 2, when the cap is in an open position with reference to the container opening. Fig. 6 illustrates a view of a modified form of the cap shown in Fig. 2, portions being shown broken away to better illustrate the construction.

A lockable cap embodying my invention includes in its arrangement a collar adapted to surround the opening of the particular container to which the cap is applied. The collar may have operatively associated therewith a connector element which is adaptable to various forms of container openings and is particularly useful in engaging the lip or the spout commonly formed on fuel tanks of motor vehicles. A suitable gasket may be provided in the collar and may cooperate with the connector element to seal the collar against the escape of the material contained in the container. The collar has an integral housing portion over which is supported the cap. Preferably, the cap is pivotally mounted on the housing and resilient means is provided in the housing to yieldingly maintain the cap in an upright position when open and to resist closing movements of the cap. A latch bolt is movably supported in the cap and is adapted to engage a keeper which may be formed integral with the collar at a point diametrically opposed to the housing. Elements for operating the latch are movably supported in the housing and are actuated by a means extending into the housing from a point remote to the cap but conveniently accessible to an operator.

In the particular construction shown in the accompanying drawing for purposes of illustration, a collar element 1 is provided and is adapted to surround the opening 2 defined by a spout 3 of the tank or container 4. The container may be of a well-known form and structure and is mounted in the body 5 of a motor vehicle.

As is well-known and common in fuel tank spouts, like the spout 3, an inner lip 8 having an edge cam surface 9 is usually provided thereon for connecting the conventional cap to the spout in a container closing position. In securing the collar 1 in position relative to the spout 3, the lip 8 may be utilized and engaged by a connector element 10 movably mounted in a recessed shoulder portion 11 of the collar. Preferably, the element 10 has an annular body portion 12 from which depend a plurality of legs 14. Each leg 14 has an outwardly turned foot portion 15. The body portion 12 is adapted to be moved in the recessed portion 11 of the collar and to thereby move the respective foot portions 15 over the cam surface 9 to draw and clamp the collar tightly against the edge of the spout 3. If desired, a suitable locking means, such as the locking screw 20, may be provided to prevent undesired movement of the element after it has been set in collar clamping relation. Further, if desired, a suitable gasket 21 may be located intermediate the edge of the spout and a portion of the collar to seal the collar to the spout and prevent escape, as by a splashing flow, of the material within the container.

A housing portion 23 is formed on the collar 1 and extends outwardly from the periphery thereof in which portion certain of the operating parts of the construction are housed. One end of the housing portion is open to permit lubrication and replacement of parts and is adapted to be closed and covered by a cap 25 when the same is in container closing position. The cap 25 has an outer shell 26 which may be decoratively configured and within which is movably supported a latch bolt 27. A plurality of spiders or cradling web portions 28 may be provided and disposed at various points within the shell 26. Each web 28 may have a channel portion 29 approximating the cross sectional contour of the latch bolt 27. The latch bolt may be guided and supported by the said webs in its reciprocatory movements relative to the shell. A cup-shaped plate 30 may be suitably press fitted into the shell 26 to bear against the web portions 28 and to substantially enclose the latch bolt 27 in the head of the shell 26. The plate 30 has an opening 31 through which is adapted to extend, when the cap is in closed position, a keeper 32 formed, preferably, integral with the collar 1 and at a point diametrically opposed on the collar to the housing portion 23. The latch bolt 27 may be urged to engage the keeper by a resilient element, such as the spring 33, which is suitably mounted on the plate 30, as at 34, and engages the latch bolt 27, as at 35. Thus, the latch bolt 27 will automatically engage the keeper upon closure of the cap.

The cap 25 is preferably movably mounted with reference to the collar so that the relation of the latch bolt and keeper will always be establishable, notwithstanding sequential openings of the container or carefree closure thereof. The shell 26 therefore, is provided with a pair of ears 36 which extend inwardly to substantially enclasp the outer surfaces of the walls of the housing portion. A pin 37 extends through the ears and housing portion walls to pivotally support the cap with reference to the collar 1. If desired, a suitable spring 38 may be supported on the pin 37 and bear against the plate 30 and one of the walls of the housing portion 23 to yieldingly resist pivotal movements of the cap toward closure and to move the cap from a closed position to an upright one upon unlatching of the cap.

The cap is unlatched by a movement of the latch bolt 27 with reference to the keeper 32 which movement is effected by a latch bolt actuating element 40. The element 40 is movably supported in the housing portion and is adapted, when moved in one direction, to engage the latch bolt and move the same out of engagement with the keeper 32. In the form of construction illustrated in Figs. 1 to 5, the element 40 is pivotally supported, as by a pin 41, at a point substantially central to its length and so that movement of one end of the element in one direction will cause a movement of the other end to engage the latch bolt and move the same against the resistance of the spring 33 and from engagement with the keeper 32. If desired, the latch bolt may have an angularly bent portion 42 which extends through a slotted opening 43 formed in the plate 30 and facilitates engagement of the element 40 therewith. Further, the movement of the element 40 in a direction to effect unlatching may be yieldingly opposed by an extension 43 of the spring 38 which also operates to return the element 40 to its initial position after engagement with the latch bolt.

The element 40 is preferably caused to move by a means operative from a point remote from the cap and its associated container. As shown in the particular form selected, the element operating means includes a wire cable 45 which extends through a flexible tube 46. One end of the cable is connected to a hand operated plunger button 47 suitably mounted and disposed on the body of the vehicle in a position of easy convenience to the vehicle operator, as on the dashboard 51, and the other end is adapted to enter the housing portion through an opening 48 formed therein. The said end extending into the housing portion 23 is adapted to seat in a recess 49 formed in the element 40 so that, when the plunger button 47 is depressed, it will bear against the element 40 and move the same to effect a latch bolt movement and unlatching of the cap. If desired, the opening 48 may be surrounded by a suitably threaded boss portion 52 to which may be threadably connected a connector 50 for connecting the flexible tube 46. Thus, it will be appreciated that by merely depressing the button 47, the cap may be opened and, by merely moving the cap to a closed position, the cap will become locked over the container opening.

Fig. 6 of the accompanying drawing illustrates a modified form of construction embodying my invention and particularly adaptable to a container or tank, the spout 3 of which extends at a marked angle rearwardly to the general plane of the vehicle body. The details of construction of the form shown in Fig. 6 may be substantially similar to those above described but for the latch bolt operating means. The latch bolt operating means of the modified form includes an element 60 which is slidably supported for reciprocation in ways defined by a tab portion 61 within the housing. One end of the element 60 has a cam surface 62 which is adapted to engage a corresponding cam surface 63 formed on the bent portion 65 of the latch bolt 27 and move the latch bolt from engagement with the keeper when the element 60 is moved in one direction. The other end of the element 60 has a recess 69 into which extends an end of the operating cable 66, like unto the cable 45 of the preferred form. If desired, the movement of element 60 toward the latch bolt 27 may be yieldingly resisted by an extension of a spring 67 connected, as at 68, to the element 60, which also operates to return the element 60 to its initial position. The spring 67 is like in other respects to the spring 38 of the preferred form.

I claim:

1. In combination with a container having an opening, a collar surrounding the opening, the collar having a housing portion and a keeper portion formed at diametrically opposed points on the collar, a closure cap for closing said opening pivotally connected to said housing portion, a latch bolt movably supported in said cap and adapted to engage said keeper portion when the cap is located in closing relation to the opening, a movable element disposed in said housing portion adapted to engage and move the latch bolt from engagement with the keeper, and a member for actuating said element from a point remote to said cap.

2. In combination with a container having an opening, a collar surrounding the opening, the collar having a housing portion and a keeper portion formed at diametrically opposed points on the collar, a closure cap for closing said opening pivotally connected to said housing portion, a latch bolt movably supported in said cap and adapted to engage said keeper portion when the cap is located in closing relation to the opening, a movable element pivotally mounted in said housing portion and adapted to engage and move the latch bolt from engagement with the keeper, and a member for pivotally moving the element from a point remote to the said cap.

3. In combination with a container having an opening, the opening having a cam edged lip, a closure cap for closing said opening, a collar element for supporting said cap, and a connector element for connecting said collar relative to said opening comprising an annular body having a plurality of legs, each leg extending substantially parallel to the axis of annular body and in a common direction, each leg having outwardly extending foot portion adapted to engage the cam edged lip and draw the body toward the opening as the body is rotated relative thereto.

4. In combination with a container having an opening, a collar surrounding the opening, a closure cap for closing said opening and pivotally supported on the collar, means for locking the cap in closed position with reference to said opening, and means for operating the said first named means disposed on said collar adjacent to the said cap pivotal support.

5. In combination with a container having an opening, a closure cap for closing said opening, an element for pivotally supporting said cap in a position whereby the cap may be moved from covering to uncovering positions with reference to said opening, an operable locking means carried by said cap for locking the cap in an opening covering position, and an element for operating said locking means movably supported on the container and located on the same side of a line describing the diameter of said opening as that on which the said first named element is located.

6. A connector element for connecting a member to another member having an opening, the opening having a cam-edged lip, the said element comprising an annular body having a leg extending in an axial direction with reference to the annular body, the leg having an angularly extending foot portion adapted to engage the cam-edged lip and drawing the annular body toward the opening as the annular body is rotated about its axis to thereby clamp the first member to the second member.

7. In combination with a container having an opening, a closure cap for closing said opening, the cap pivotally mounted at a position adjacent the opening whereby the cap may be moved from covering to uncovering positions with reference to said opening, an operable locking element carried by said cap and movable with respect thereto for locking the cap in an opening covering position and a member for operating said operable locking element movably supported in spaced angular relation to the cap and with respect to its pivotal mounting.

8. In combination with a container having an opening, a closure cap for closing said opening, means for pivotally supporting the cap adjacent the opening, an operable locking element for holding the cap in closed position over the opening, and means for operating the operable locking element mounted on the container in proximity to the cap pivotal supporting means.

CHARLES A. ROESCH.